US011919116B1

(12) United States Patent
Paine et al.

(10) Patent No.: US 11,919,116 B1
(45) Date of Patent: Mar. 5, 2024

(54) METHODS OF ALIGNING COMPONENTS FOR VEHICLE ASSEMBLY

(71) Applicant: The United States of America as represented by the Secretary of the Navy, Keyport, WA (US)

(72) Inventors: Tyler Paine, Edmonds, WA (US); Christopher Walther, Gig Harbor, WA (US); Nicholas Johnson, Bremerton, WA (US); Scott Larson, Bremerton, WA (US)

(*) Notice: Subject to any disclaimer, the term of this patent is extended or adjusted under 35 U.S.C. 154(b) by 571 days.

(21) Appl. No.: 16/974,430

(22) Filed: Jan. 29, 2021

Related U.S. Application Data

(60) Provisional application No. 63/101,287, filed on Apr. 23, 2020.

(51) Int. Cl.
| | | |
|---|---|---|
| *B21D 39/00* | (2006.01) | |
| *B23Q 3/18* | (2006.01) | |
| *B63B 73/30* | (2020.01) | |
| *B62D 65/02* | (2006.01) | |
| *B64F 5/10* | (2017.01) | |

(52) U.S. Cl.
CPC .............. *B23Q 3/186* (2013.01); *B21D 39/00* (2013.01); *B63B 73/30* (2020.01); *B62D 65/024* (2013.01); *B64F 5/10* (2017.01); *Y10T 29/49895* (2015.01)

(58) Field of Classification Search
CPC ...... B23Q 3/186; B63B 73/30; B62D 65/026; Y10T 29/49895; B60T 3/00; B21D 39/00
See application file for complete search history.

(56) References Cited

U.S. PATENT DOCUMENTS

| | | | | |
|---|---|---|---|---|
| 3,353,880 A | * | 11/1967 | Silver | ...... F16C 13/04 |
| | | | | 384/549 |
| 2009/0194376 A1 | * | 8/2009 | Brooks | ...... B60T 3/00 |
| | | | | 188/32 |

FOREIGN PATENT DOCUMENTS

| | | | | | |
|---|---|---|---|---|---|
| EP | 2662181 A1 | * | 11/2013 | ............. | B23Q 3/062 |
| KR | 2012042681 A | * | 5/2012 | ............. | B23Q 3/183 |

* cited by examiner

*Primary Examiner* — Jermie E Cozart
(74) *Attorney, Agent, or Firm* — Stephen J. Leahu; Naval Undersea Warfare Center

(57) ABSTRACT

A mechanical assembly to precisely position large objects and align them to be joined with other objects with precision. The assembly does not require power to operate and can therefore be used in a variety of remote and harsh locations.

6 Claims, 17 Drawing Sheets

METHODS OF ALIGNING COMPONENTS FOR VEHICLE ASSEMBLY

CROSS REFERENCE TO OTHER PATENT APPLICATIONS

The present application claims the benefit of U.S. provisional patent application 63/101,287 filed 23 Apr. 2020 and titled: Precision Positioning and Handling System for Large Underwater Vehicles, the complete disclosure of which is incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Large pieces of equipment must sometimes be transported in pieces and then field assembled into their final configurations. Large pieces of equipment must also occasionally be disassembled in the field to conduct maintenance and repair activities. When maneuvering these large pieces of equipment, it can be difficult to precisely position the parts relative to each other so that they fit together properly.

One type of equipment for which the aforementioned problems frequently arise, include Large Displacement (LD) Unmanned Underwater Vehicles (UUV). The individual segments of these vehicles are too large to be transported over roads and must be assembled shore side before launch or before being placed aboard ship. In certain instances, the LDUUV is also too large to be stored aboard ship fully assembled, and the LDUUV must be assembled from its constituent parts before use. Maneuvering segments of various LDUUVs for assembly or disassembly is usually done by hand or from a swinging jig. This method can lead to over correction or under correction in the position of the constituent part, causing the sections of an LDUUV to collide with one another and causing damage to the sections.

Even when the component pieces do not collide, the operation may require several attempts, or small movements to precisely align one component with another. Crews making up the final assembly can become frustrated, or may otherwise attempt to "force" one part to join with another. These actions can in turn result in accidents or damage to a component when one part is forced into position against another.

Prior art devices exist but fail to fully address the need. In one example, Penn State has developed a rail and roller assembly for smaller UUVs, such as for Penn State's LTV 38 and LTV 48. This system is too small to accommodate the size and weight of LDUUVs currently in use. This system does not have the fine adjustment and alignment features of the present invention in all axes and degrees of movement.

Prior art devices also include assembly systems for extra-large UUVs (XLUUV). These systems require that the operators flood a large tank and then suspend the XLUUV sections in water. These systems require space for a tank and access to a plentiful water supply. Such conditions may not be present for all applications, especially if assembling large pieces of equipment in remote landlocked locations. In addition, the tank must be carefully constructed and maintained, including careful alignment and attention to tank fittings, joints, and O-rings, to ensure a tank failure does not flood a ship's deck or a shop floor. In addition, the XLUUV assembled using such methods must be designed to tolerate the possible ingress of water. This fact adds additional costs to the design and in addition reduces the reliability of the XLUUV due to the risk of such protections being compromised.

Other methods for assembling XLUUVs include those used with the Boeing ORCA XLUUV. These methods require large overhead cranes and shop floors with enough square footage to maneuver the component pieces into position. These methods consume large areas of a shop or manufacturing floor, making those areas unavailable for other uses. These methods additionally do not permit fine and precise alignments of the constituent parts. The XLUUVs assembled using these techniques must therefore also be designed to accommodate the abuse and possible misalignment that likely occurs during assembly of the completed vehicle. The XLUUV thus costs more and may also include design trade-offs such as for example: lower endurance from a beefier structure, or increased size or loss of interior carrying capacity, that would not otherwise be required if the vehicle could be designed and assembled with more precise alignment.

The prior art does not include a system to allow for assembly and disassembly of LDUUVs, or equipment of similar size, and which also reduces instances or opportunities for damage or misalignments.

SUMMARY OF THE INVENTION

The present invention includes recognition of the problems and disadvantages of prior art devices. The current invention is small enough to operate on decks and in enclosed spaces, such as a shop, does not need to be flooded, and eliminates the need for free swinging systems that often lead to misalignments and damage.

According to one aspect of the invention, precise alignment and positioning of equipment components within predetermined tolerances is possible. According to one aspect of the invention, the part to be aligned can be aligned using threaded screws which each permit position adjustment in one of multiple directions, with precision to thousandths of an inch in any direction. The precision adjustments of the invention reduce chances of overcorrection or under correction when aligning equipment components such as LDUUVs; and eliminate the need to "force" one part to join with another.

According to another aspect of the invention the precision positioning and handling system is ideal for harsh environments due to its being entirely mechanical. Without electrical components to degrade, the invention may be used in environments such as seawater or near caustic lakes or geysers. Eliminating electrically operated components of the invention also increases reliability by removing a possible point of failure (electrical and electronic components). The invention may also be used in environments where electricity is not available or is in short supply, such as a remote mine, farm field, or in earth orbit and space for example.

According to still another aspect of the invention includes handles on the sides. The handles may also be used to manually slide the assembly, with or without attached equipment, along a set of factory rails. When properly sized, the handles may be used to secure a load, such as an LDUUV, to a rail for safe transportation if needed, either by a rail, or to be hoisted by a forklift or crane According to another aspect of the invention, the present invention can be used on a dock, shop floor, or a ship deck.

The invention can also be used on an assembly cart, so long as there is a place for the rails and rollers.

According to yet another aspect of the invention, the invention may be constructed from corrosion resistant materials and its design is inherently resistant to corrosion.

Although the invention is explained below in the context of assembly of an LDUUV, the invention and its inherent advantages are also suitable for use in a variety of other applications where large pieces of equipment are to be joined or disjoined. For example, the invention can be used anywhere precise alignment of large machinery or components is desired. Such applications include: automobile and aircraft assembly lines; oil and gas machinery; farming equipment and applications, and power generation where maneuvering and adjusting large equipment is often necessary. Such applications can also include mining industry applications where it is necessary to assemble large machinery in situ and running power to the location is difficult or impossible. Such applications additionally include, for example, the International Space Station, where it is desirable for manipulating large bulky items with a minimal amount of tools and without drawing down the ISS' power.

Further advantages and features of the present invention will be described in detail below.

BRIEF DESCRIPTION OF THE DRAWINGS

Like reference numerals refer to similar elements or features throughout the drawings.

DESCRIPTION OF EXEMPLARY
EMBODIMENTS OF THE INVENTION

Figure 1:
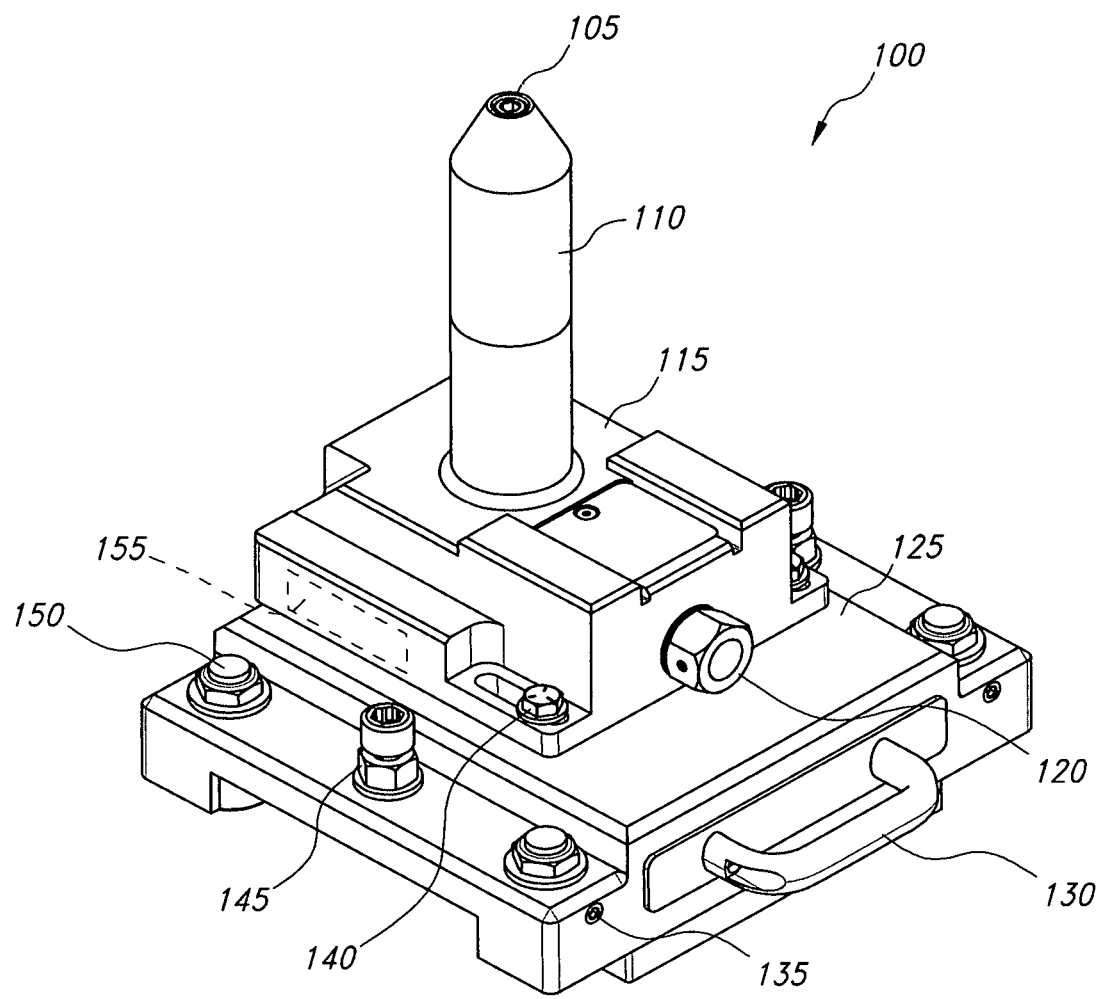
FIG. 1 is a perspective view of a fixed roller according to an embodiment of the invention.

FIG. 1 is a perspective view of a fully assembled fixed roller 100 according to an embodiment of the invention. Roller 100 comprises a post screw 105, upper post 110, sway assembly 115, lead screw 120, base block assembly 125, handle 130, roller screw 135, lateral movement locking screw 140, headed thrust screw 145, cam follower nut 150, and information panel 155.

Upper post 110 can be manufactured to be any desired height as needed for a specific assembly job. Handle 130 assists in moving and maneuvering segments of vehicles, and if appropriately sized, may also be used to secure the assembly to a rail with a strap or rope to allow for transport of the entire segment to another assembly or storage; or to otherwise tie off the vehicle.

Figure 2:
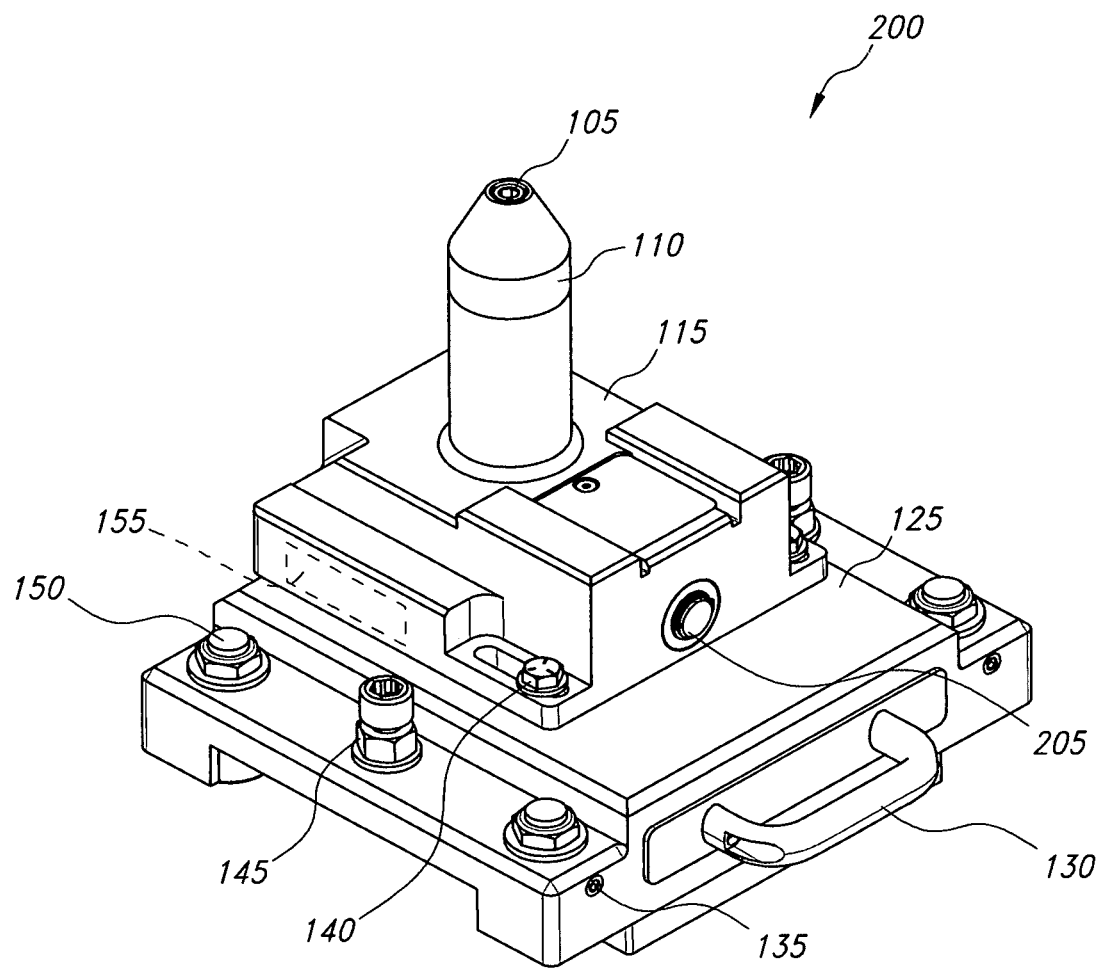
FIG. 2 is a perspective view of a floating roller according to an embodiment of the invention.

FIG. 2 shows a fully assembled floating roller 200. Floating roller 200 is nearly identical to fixed roller 100, but includes slide-floating pin 205 in place of lead screw 120. The invention uses pairs of fixed rollers 100 and floating rollers 200 to facilitate movement of an LDUUV or bulky equipment in the six degrees of freedom of movement. The use of the pairs of rollers is described in further detail below.

Figure 3A:
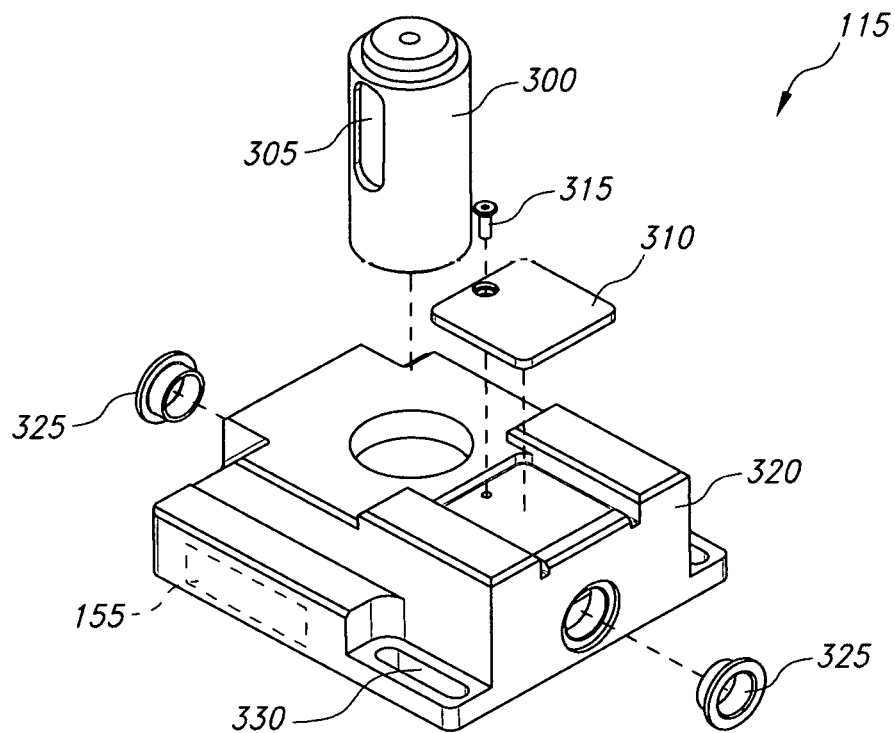
FIGS. 3A-3B illustrate assembly of a sway assembly according to an embodiment of the invention.

Sway assembly 115 is shown in detail in FIG. 3A. Sway assembly 115 includes bottom post 300, safety screw slot 305, contact pad 310, contact pad screw 315, top receiver 320, lead screw bushing 325, and lateral movement slot 330. Safety screw slot 305 is machined into bottom post 300. Bottom post 300 affixes to top receiver 320 by any of several means, such as welding or epoxy for example. Contact pad 310 is secured to top receiver 320 with contact pad screw 315. Contact pad 310 is constructed of a durable material, such as stainless steel for example, to withstand deformation under load and during use. A hole is bored through top receiver 320 on both sides, where lead screw bushing 325 is secured. Lead screw 120 (as shown in FIG. 1) or slide floating pin 205 (as shown in FIG. 2) slots though lead screw bushing 325. Lateral movement slot 330, milled into top receiver 320, allows for top receiver 320 to move laterally across base block assembly 125 (Shown in FIGS. 1 and 2).

Figure 3B:
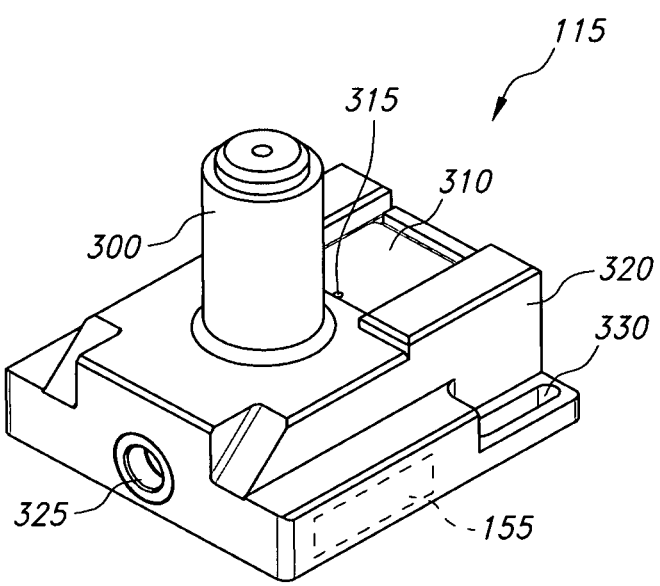

A fully assembled sway assembly 115 is shown in FIG. 3B. Sway assembly 115 is assembled in the same manner for both fixed roller 100 and floating roller 200.

Figure 4A:
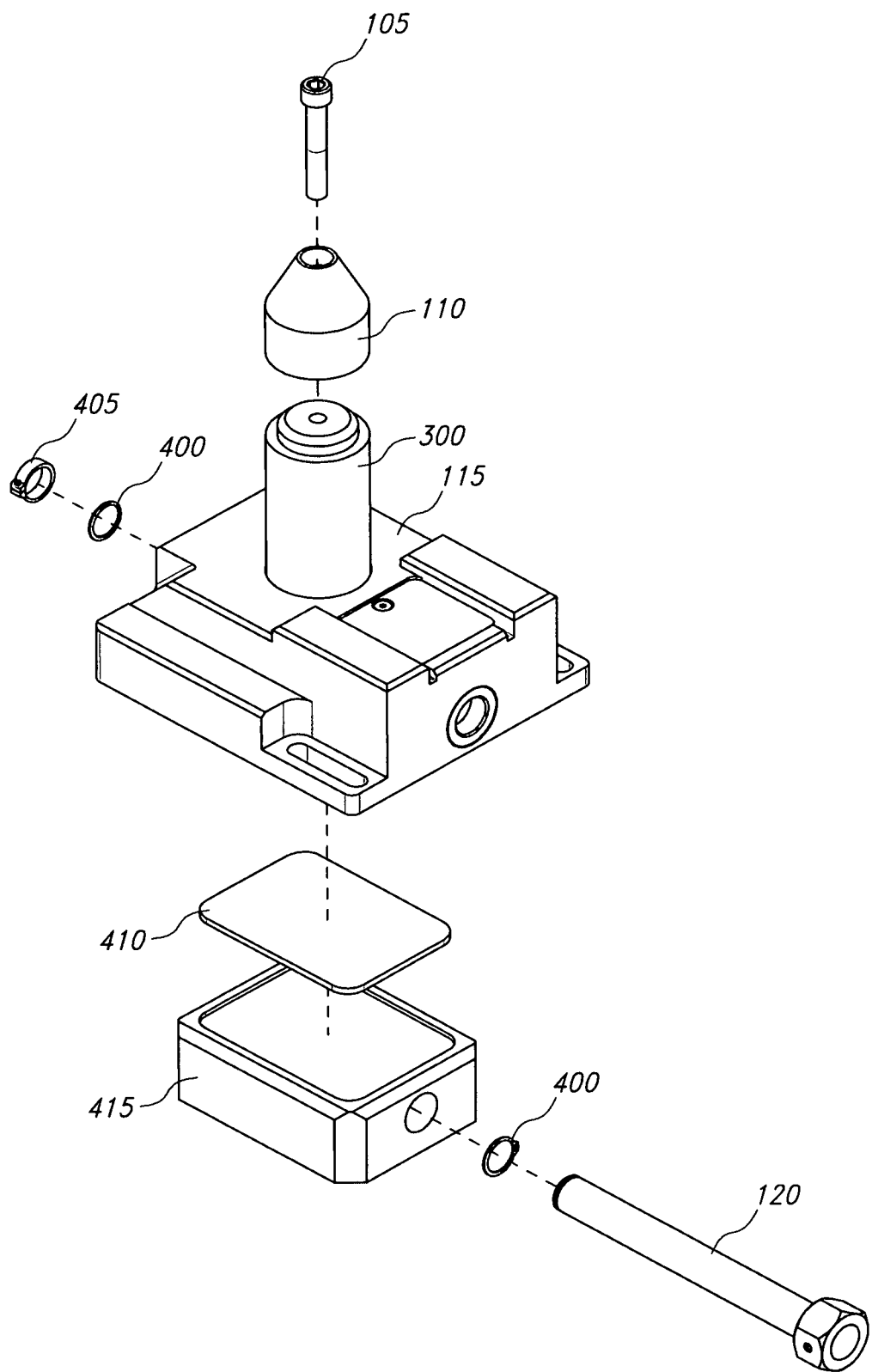
FIGS. 4A-D illustrate the interior mechanics and assembly of the upper half of a fixed and floating roller according to an embodiment of the invention.

FIGS. 4A-4D illustrate how post screw 105, upper post 110, and sway assembly 115 are prepared for full assembly. FIG. 4A shows the assembly of sway assembly 115 for fixed roller 100 and includes shaft washer 400, shaft collar 405, sliding pad 410, and bottom slide fixed 415. Post screw 105 slots through upper post 110 into bottom post 300, securing upper post 110 to sway assembly 115. Sliding pad 410 is placed on top of bottom slide fixed 415. Both slot into the underside of sway assembly 115. Bottom slide fixed 415 is constructed to be smaller than sway assembly 115 to allow for lateral movement of the system to a predetermined tolerance. A shaft is drilled through the center of bottom slide fixed 415 that aligns with lead screw bushing 325. Lead screw 120 slots though lead screw bushing 325 and bottom slide fixed 415, being secured on the other side by shaft washer 400 and shaft collar 405.

Figure 4B:
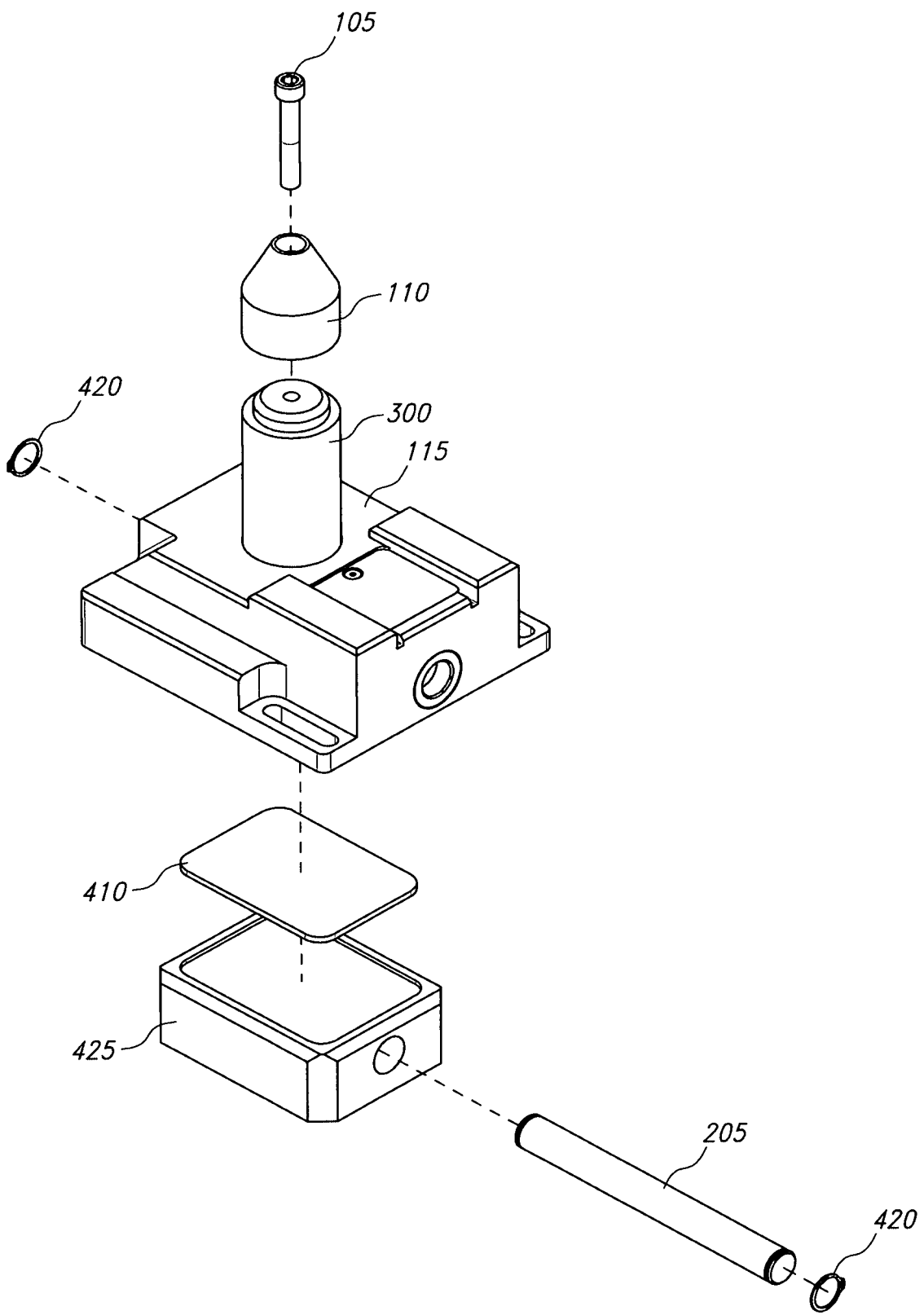

FIG. 4B illustrates the assembly of sway assembly 115 for floating roller 200. FIG. 4B includes retaining ring 420 and bottom slide float 425. FIG. 4B is assembled in a similar manner as FIG. 4A, installing floating pin 205 instead of lead screw 120, and securing floating pin 205 with retaining ring 420 instead of shaft washer 400.

Figure 4C:
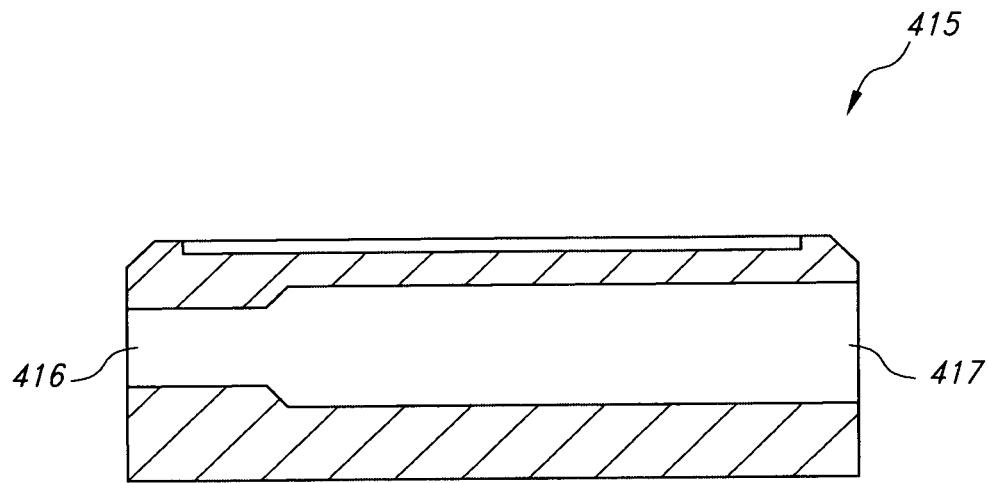

FIG. 4C illustrates the interior construction of bottom slide fixed 415. Bottom slide fixed 415 comprises interior threaded shaft 416 and interior shaft 417 having different diameters. Lead screw 120 slots through interior shaft 417, then through threaded shaft 416. As lead screw 120 is turned clockwise or anti-clockwise, the threads of lead screw 120 catch the threads of threaded shaft 416, moving bottom slide fixed 415 along lead screw 120. Bottom slide fixed 415 catches one side or another of sway assembly 115, pushing or pulling sway assembly 115 laterally across base block assembly 125.

Figure 4D:
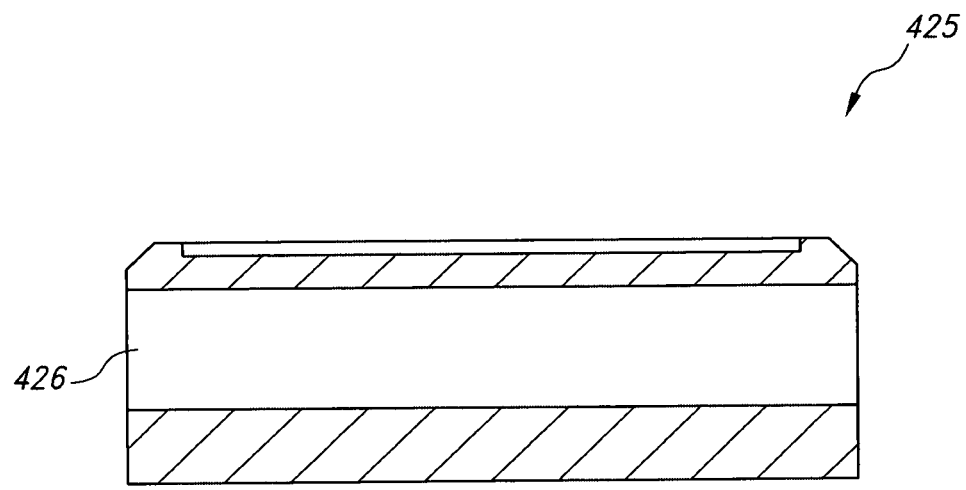

FIG. 4D illustrates the interior construction of bottom slide float 425. Float 425 includes interior shaft 426. Floating pin 205 slots through interior shaft 426. As bottom slide fixed 415 moves laterally, bottom slide float 425 slides in tandem along floating pin 205.

Figure 5A:
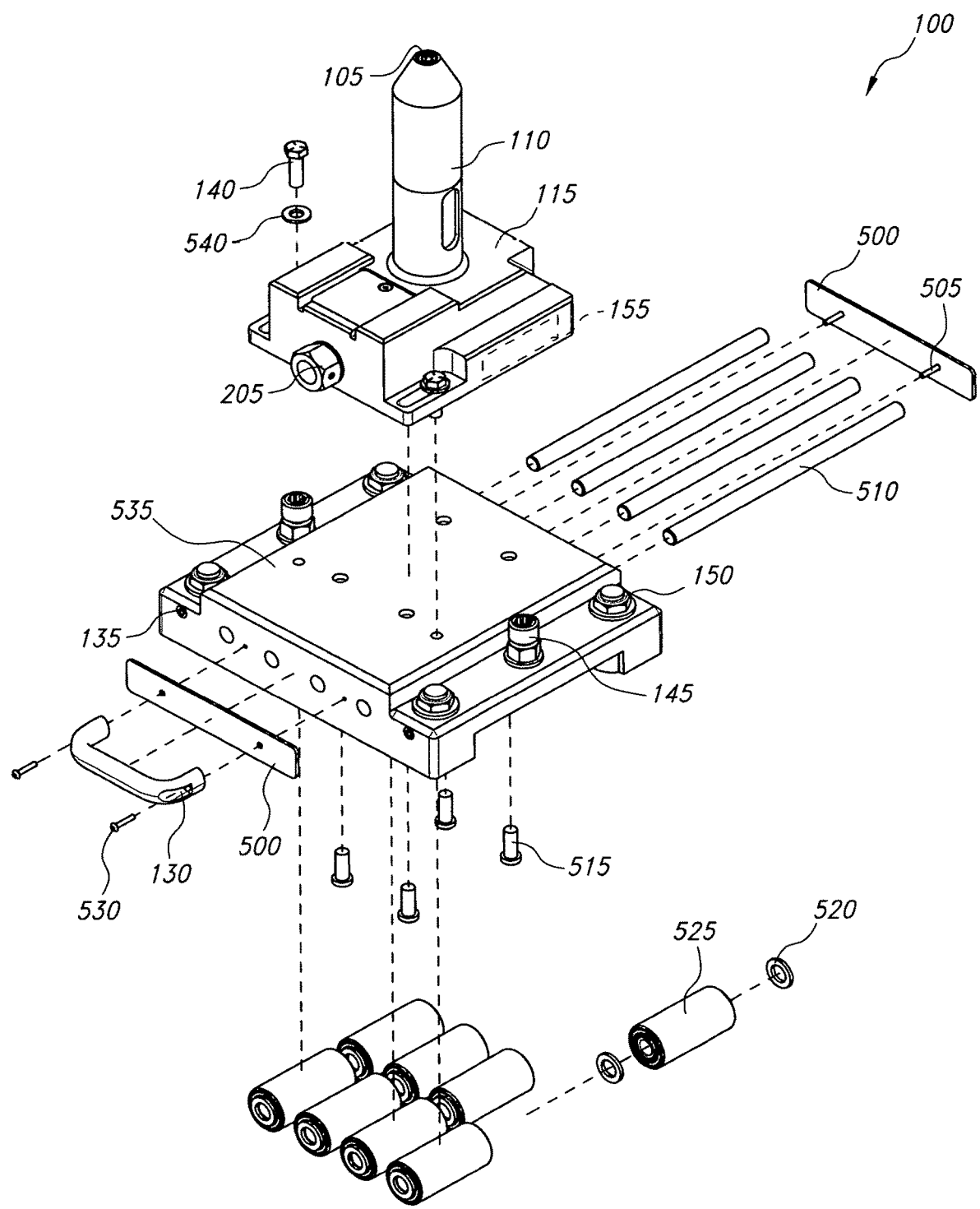
FIGS. 5A-B illustrate the assembly of a fixed and floating roller according to an embodiment of the invention.

The assembly of fixed roller 100 is shown in FIG. 5A. It includes axle retaining plate 500, axle retaining plate screw 505, a plurality of roller axles 510, slide screw 515, thrust bearing 520, roller assembly 525, handle screw 530, base block 535, and lateral movement screw washer 540. Sway assembly 115 attaches to base block 535 with lateral movement screw 140. Bottom slide fixed 415 bolts to base block 535 with a plurality of slide screws 515. A plurality of roller assembly 525 and thrust bearing 520 slot into the bottom of base block 535. Roller axles 510 slot through pre-drilled holes in base block 535, through thrust bearing 520, then through roller assembly 525. Roller axles 510 secure in place with a plurality of axle retaining plates 500 and a plurality of axle retaining plate screws 505. Handle 130 attaches to axle retaining plate 500 with a plurality of handle screw 530. Headed thrust screw 145 screws into the central drilled hole on each side of base block 535. Cam follower nut 150 is secured on each corner of base block 535. Roller screw 135 secures the cam followers through the sides of base block 535.

Figure 5B:
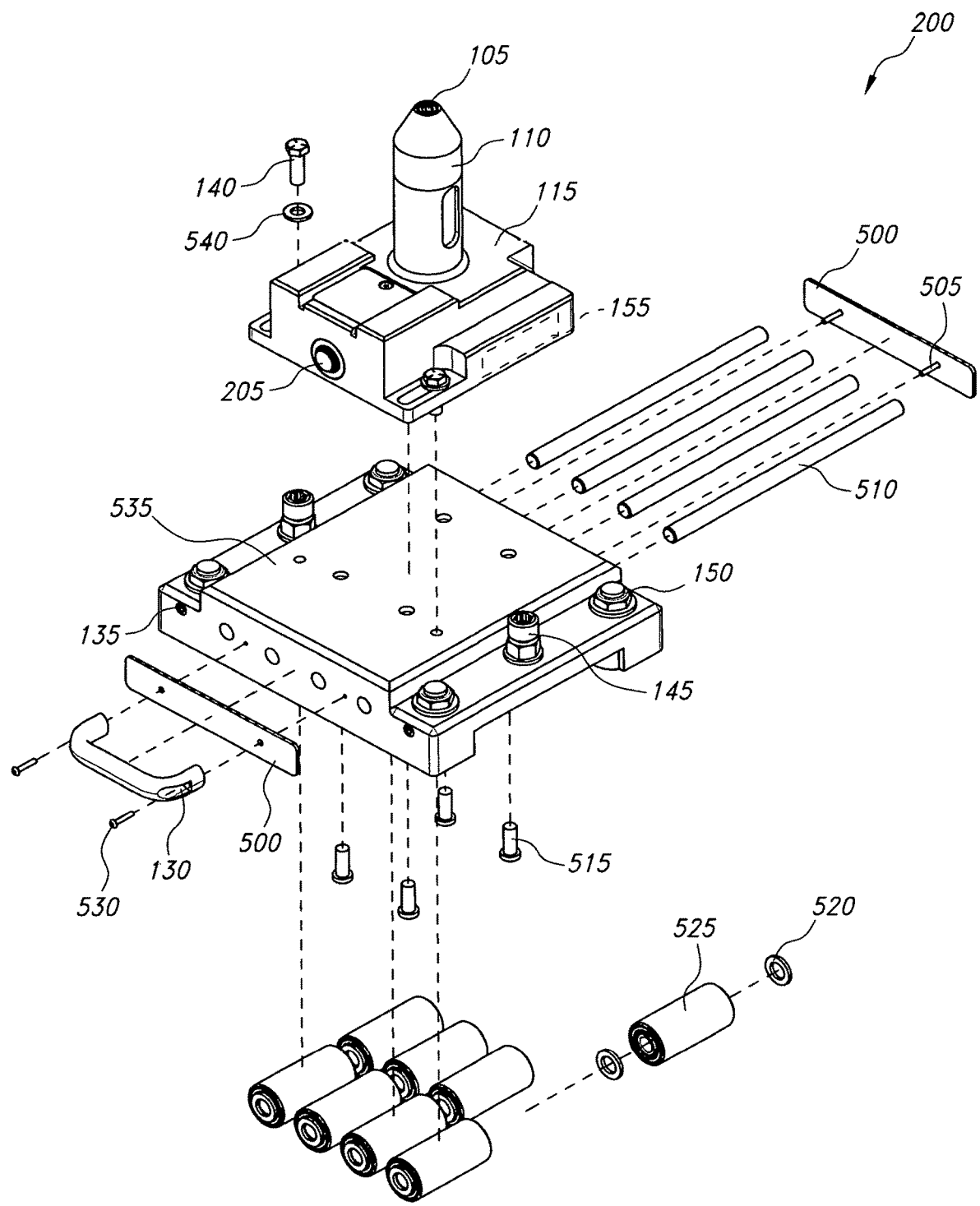

FIG. 5B shows the assembly of floating roller 200. Floating roller 200 is assembled in the same manner as fixed roller 100.

Figure 6:
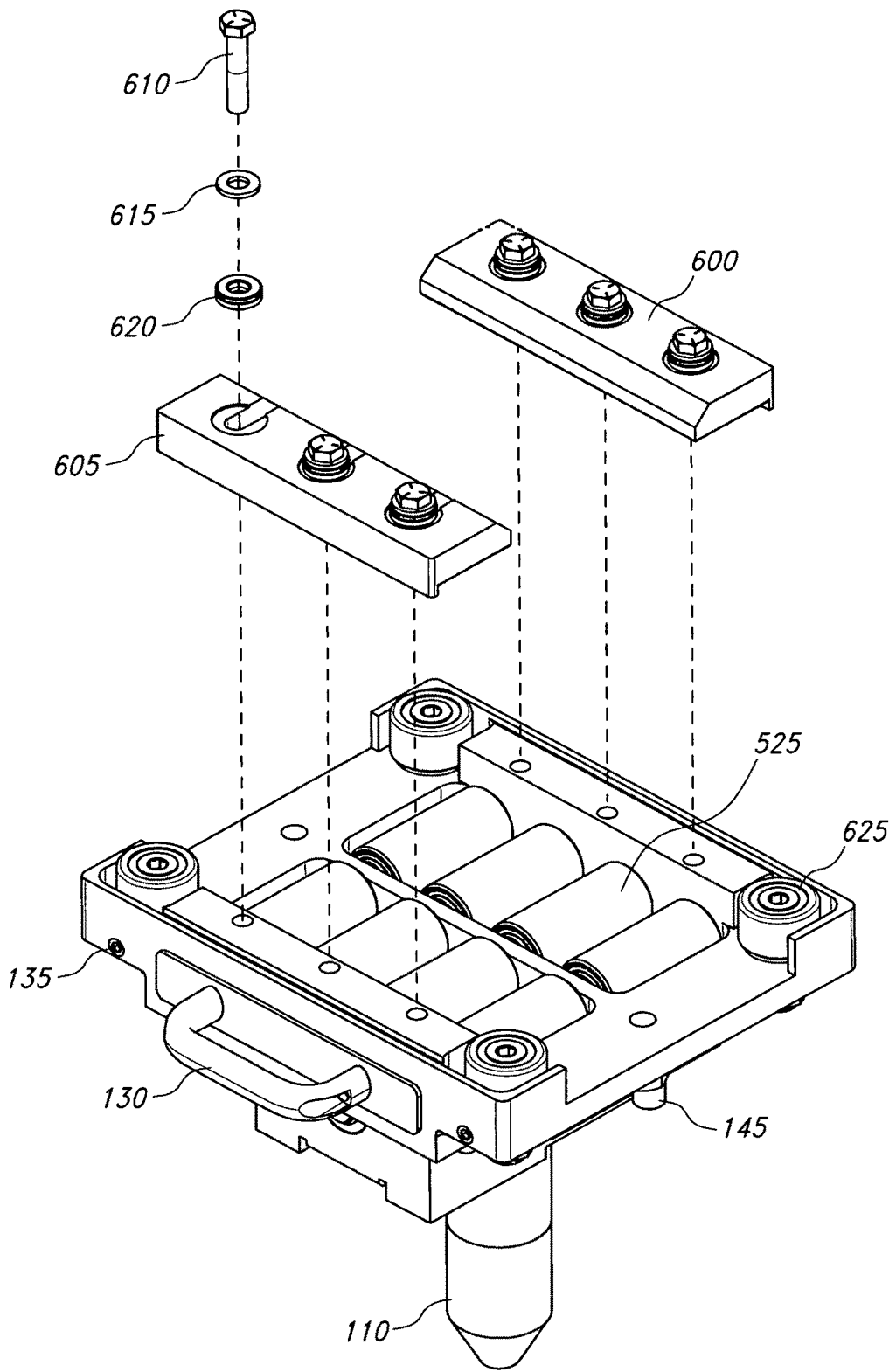
FIG. 6 shows the underside of a roller according to an embodiment of the invention.

FIG. 6 is an illustration of the underside of fixed roller 100 and floating roller 200. It comprises an inner flange clamp 600, outer flange clamp 605, flange screw 610, flange screw washer 615, flange spherical washer 620, and cam follower 625. A plurality of cam followers 625 are installed in each corner of base block 535, secured in place on the top by cam follower nut 150 and roller screw 135. Inner flange clamp 600 and outer flange clamp 605 secure to base block 535 with a plurality of flange screws 610, screw washers 615, and flange spherical washers 620. Inner flange clamp 600 and outer flange clamp 605 wrap around a rail or anchor point, keeping the invention secured during use. Cam followers 625 assist in smoothly moving the invention along the rail.

Also seen in FIG. 6 is the double rows of rollers 525. Much like a semi-truck has two sets of wheels/tires, according to one embodiment, the invention also has two rows of rollers 525. Two rows of rollers 525 allow the load from the positionable equipment to be distributed more evenly, but can also be designed such that if one row fails or becomes jammed, the remaining set can still be used. Thus, this embodiment makes it less likely that the entire positioning operation will fail, the equipment must be removed, and a new assembly be procured and installed, before the equipment can be successfully joined.

Figure 7:
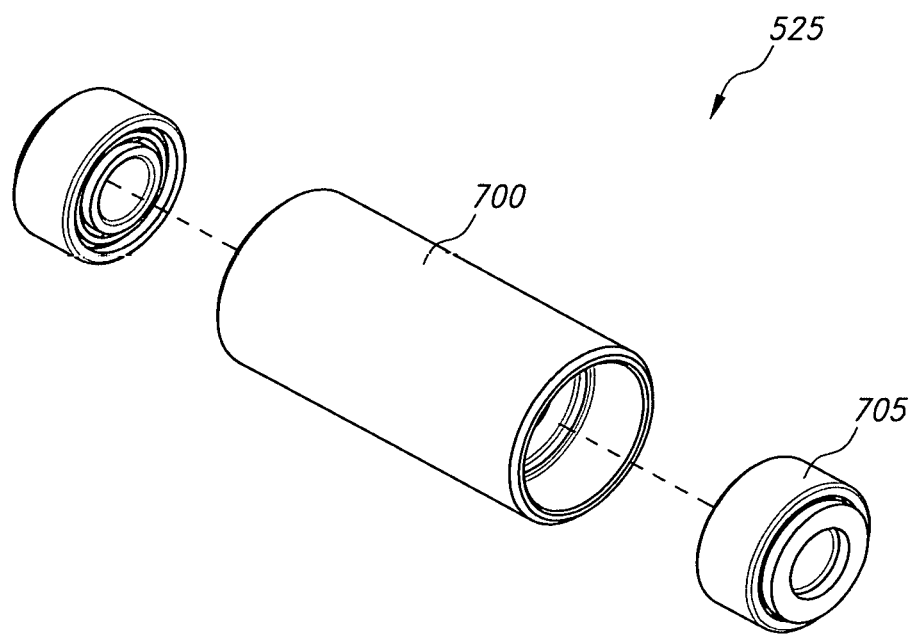
FIG. 7 is an illustration of a roller assembly according to an embodiment of the invention.

FIG. 7 shows the construction of roller assembly 525. It comprises a roller 700 and contact bearing 705. In the embodiments as illustrated, roller assembly 525 is substantially identical for both fixed roller 100 and floating roller 200 and is interchangeable between the sets of rollers.

Figure 8:
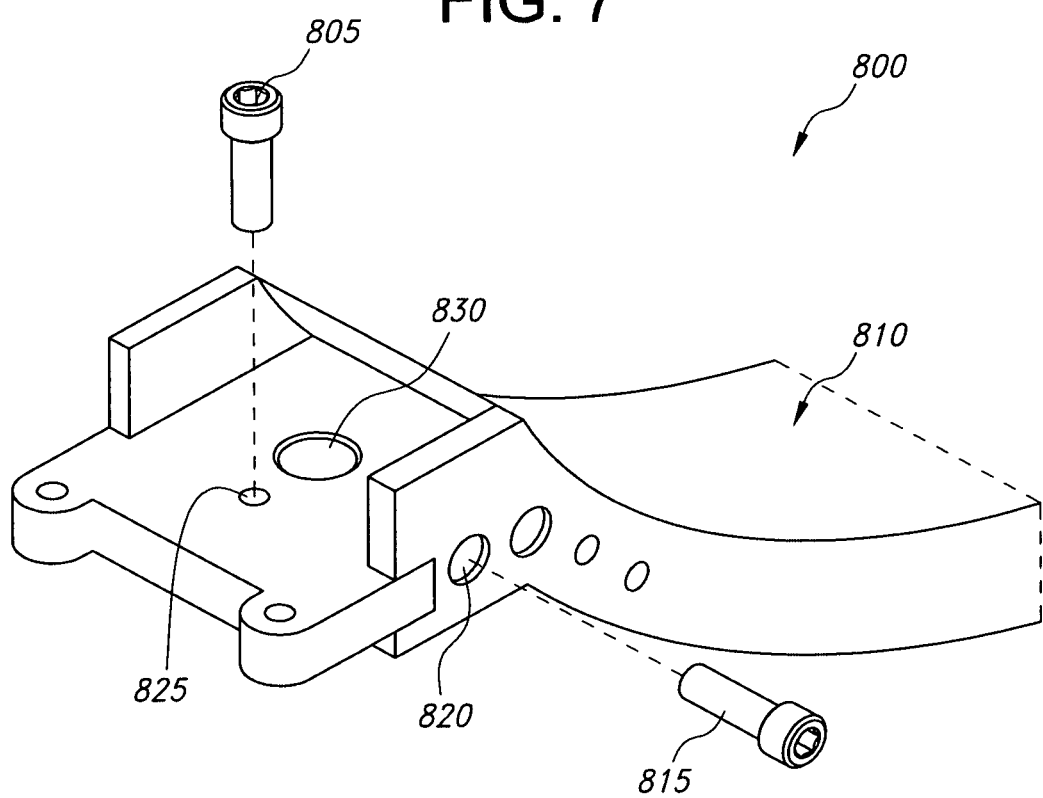
FIG. 8 illustrates an interfacing mechanism according to an embodiment of the invention.

An interface mechanism 800 is shown in FIG. 8. Interface mechanism 800 includes adjustment screw 805, chock 810, safety screw 815, safety screw hole 820, adjustment screw hole 825, and post hole 830. Chock 810 is the cradle-like structure into in which an LDUUV or piece of heavy equipment rests. Safety screw 815 and safety screw hole 820 can be used to secure chock 810 and prevent unwanted motions of chock 810 and the equipment held by chock 810. According to one embodiment of the invention, all or part of chock 810 can be painted safety orange, or another color to better identify the tips and physical extent of chock 810.

Figure 9:
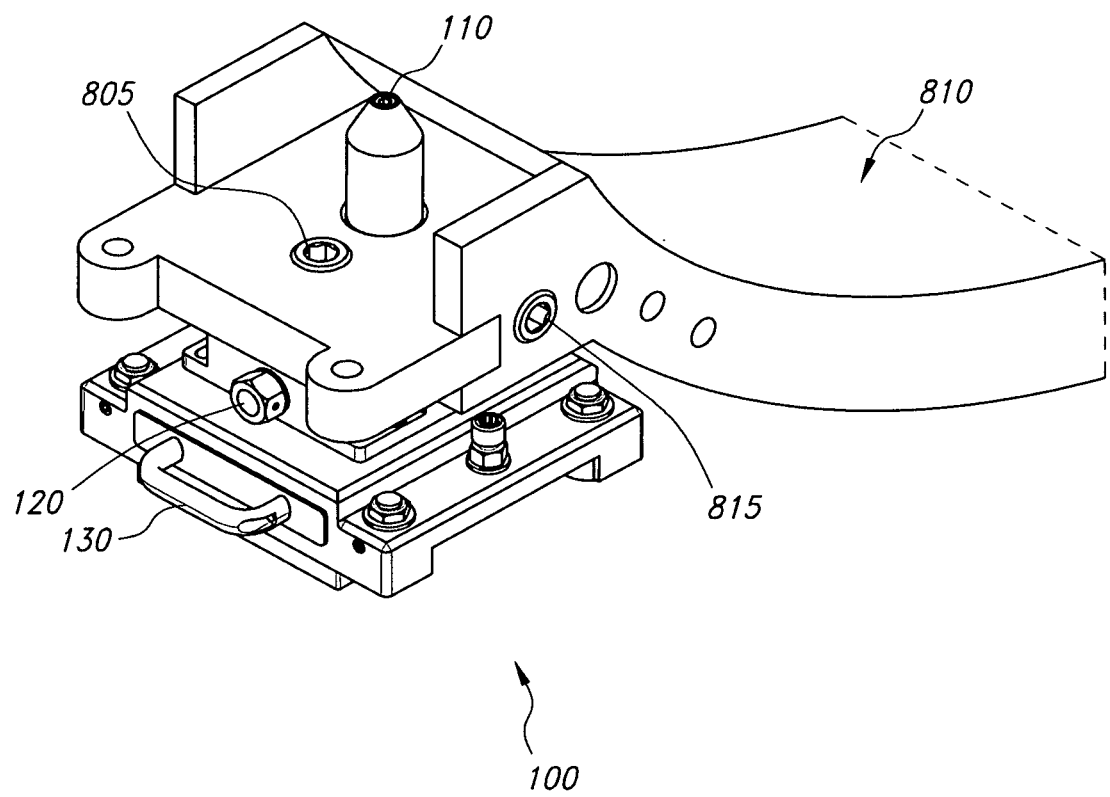
FIG. 9 shows the invention as it may be used according to an embodiment of the invention.

FIG. 9 shows an embodiment of the invention as used to adjust chock 810 for an LDUUV. Upper post 110 slots through post hole 830. Post hole 830 is drilled to be slightly larger than the diameter of upper post 110. Safety screw 815, screwed through safety screw hole 820, secures fixed roller 100 or floating roller 200 in place by applying appropriate pressure in safety screw slot 305. Adjustment screw 805 threads through adjustment screw hole 825 and rests on contact pad 310. Contact pad 310 is constructed of a durable material, such as stainless steel for example, to withstand repeated loads from adjustment screw 805.

In operation, when adjusting an LDUUV for example, all 6 degrees of freedom of movement may be used to adjust an LDUUV for assembly, disassembly, or transport. The 6 degrees of freedom of movement are lateral, or left and right; longitudinal, or forward and backward; heave, or up and down; pitch, or rolling forward and backward; roll, or rolling side to side; and yaw, or twisting left and right.

Figure 10A:
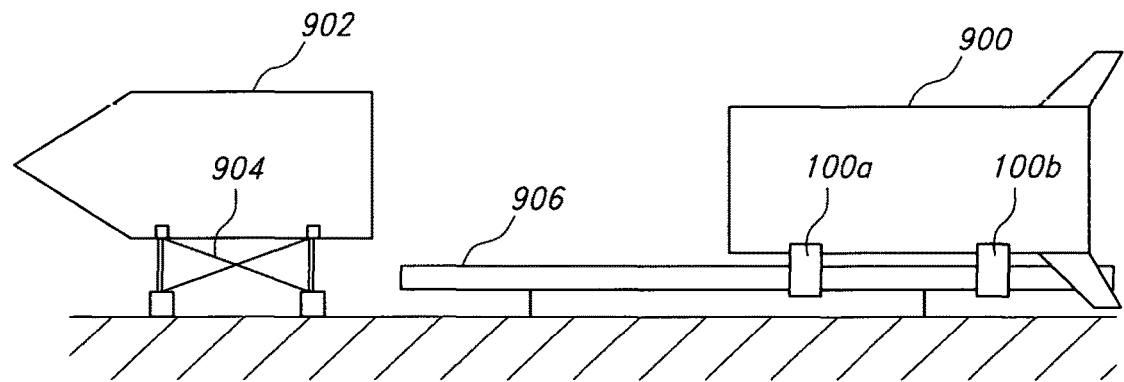
FIG. 10A is a side view of the rear section of an LDUUV being positioned to mate with a front LDUUV section according to an embodiment of the invention.
Figure 10B:
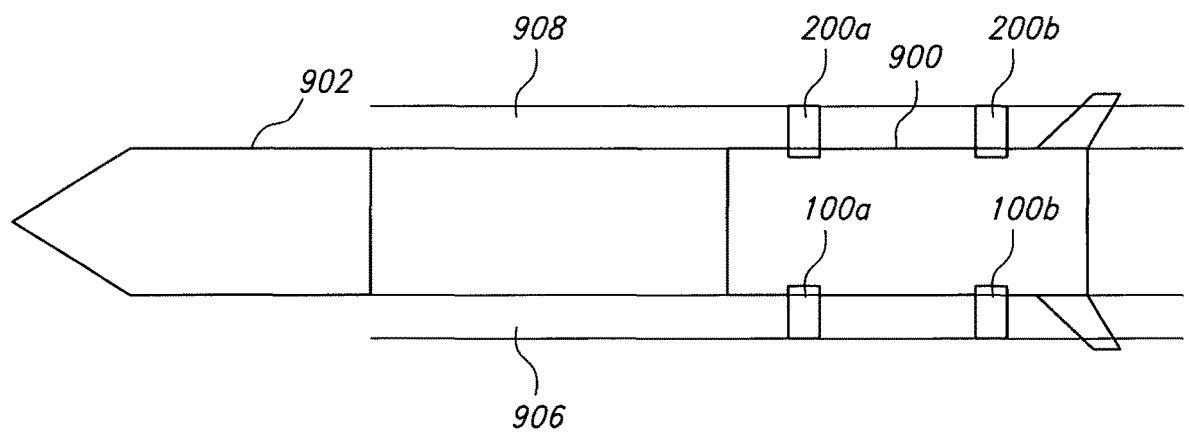
FIG. 10B is an overhead view of the rear section of an LDUUV being positioned using fixed and floating rollers according to an embodiment of the invention.

According to one embodiment of the invention, the invention is designed to be used in two pairs as shown in the example of FIGS. 10A-10D. The example of FIGS. 10A-10B shows the aft section of an LDUUV 900 being mated to a forward LDUUV section 902. In the side view of FIG. 10A, forward section 902 is shown mounted in a fixed position on stationary FIG. 904. Rear section 900 is mounted on an apparatus incorporating the invention; including first pair of fixed rollers 100a and 100b located on the same side of LDUUV section 900. In the embodiment shown, rollers 100a and 100b are configured to slide over a rail 906 that allows the entire apparatus and loaded LDUUV section to be slid proximate to section 902. As shown in the overhead view of FIG. 10B, a second pair of rollers, floating rollers 200a and 200b are located on the side of LDUUV 900 opposite rollers 100a and 100b. Rollers 200a and 200b are also shown configured to slide along rail 908.

Although LDUUV section 902 is shown secured in a fixed position using a jig or stand 901, section 902 may optionally be positioned on pairs of rollers 100 and 200 in a manner similar to section 900; or optionally held in a sling suspended from a hoist or crane; anchored or fixed into position; or any other means known to those of skill in the art for holding the main section relatively stationary. Only the section to be mated/joined with the remaining section need employ the apparatus of the invention, although it is possible to use the invention with all sections.

In operation, LDUUV section 900 is slid along rails 906 and 908 to a location proximate section 902. The apparatus of the present invention is then utilized to finely position section 900 in one or more of the six degrees of motion, such that section 900 can be mated to section 902 without damage to either section or its connection hardware. The paragraphs below describe how the invention can adjust the position of LDUUV section 900 in each of these degrees of freedom.

Figure 11:
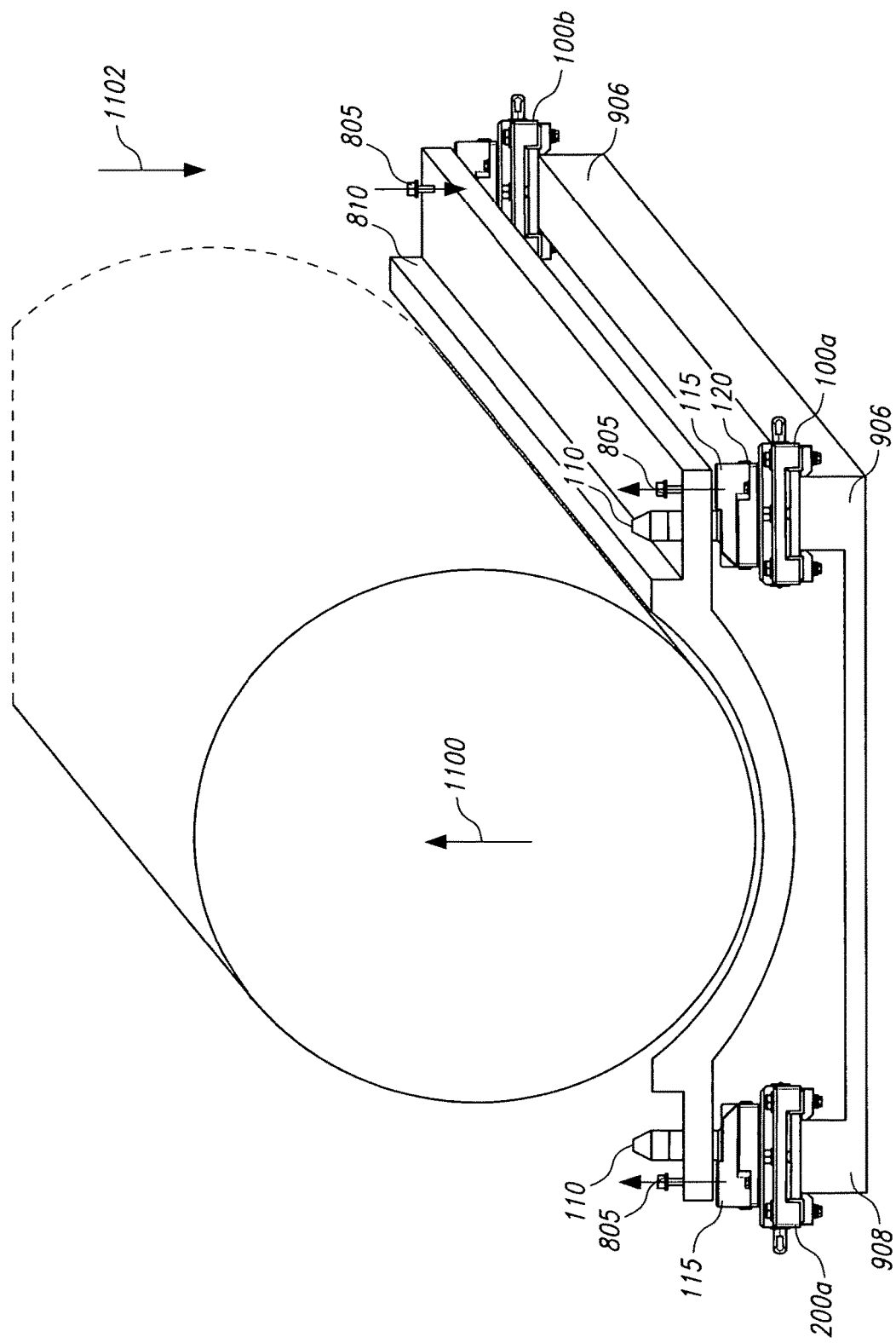
FIG. 11 is an end view of an LDUUV section being positioned in pitch according to an embodiment of the present invention.

FIG. 11 shows how to adjust an LDUUV's pitch using the invention. To adjust an LDUUV's pitch, adjustment screw 805 on a first pair of rollers—in the example of FIG. 11 rollers 100*a* and 200*a*—is raised, and adjustment screw 805 of a second pair of rollers, e.g. 100*b* and 200*b* (not shown), will remain stationary or be lowered. Post hole 830 (shown in FIG. 8) is drilled slightly larger than the diameter of the rollers' upper post 110, allowing for freedom of movement of the assembly within interfacing mechanism 800. According to the embodiment of the invention as shown, post 110 is round, and thus the mechanism can rotate allowing for twist to an extent +/−.5 inches. In the example as drawn in FIG. 11, the LDUUV is shown pitching upward in the direction of arrow 1100, while the tail end of the LDUUV is lowered in the direction of arrow 1102.

Figure 12:
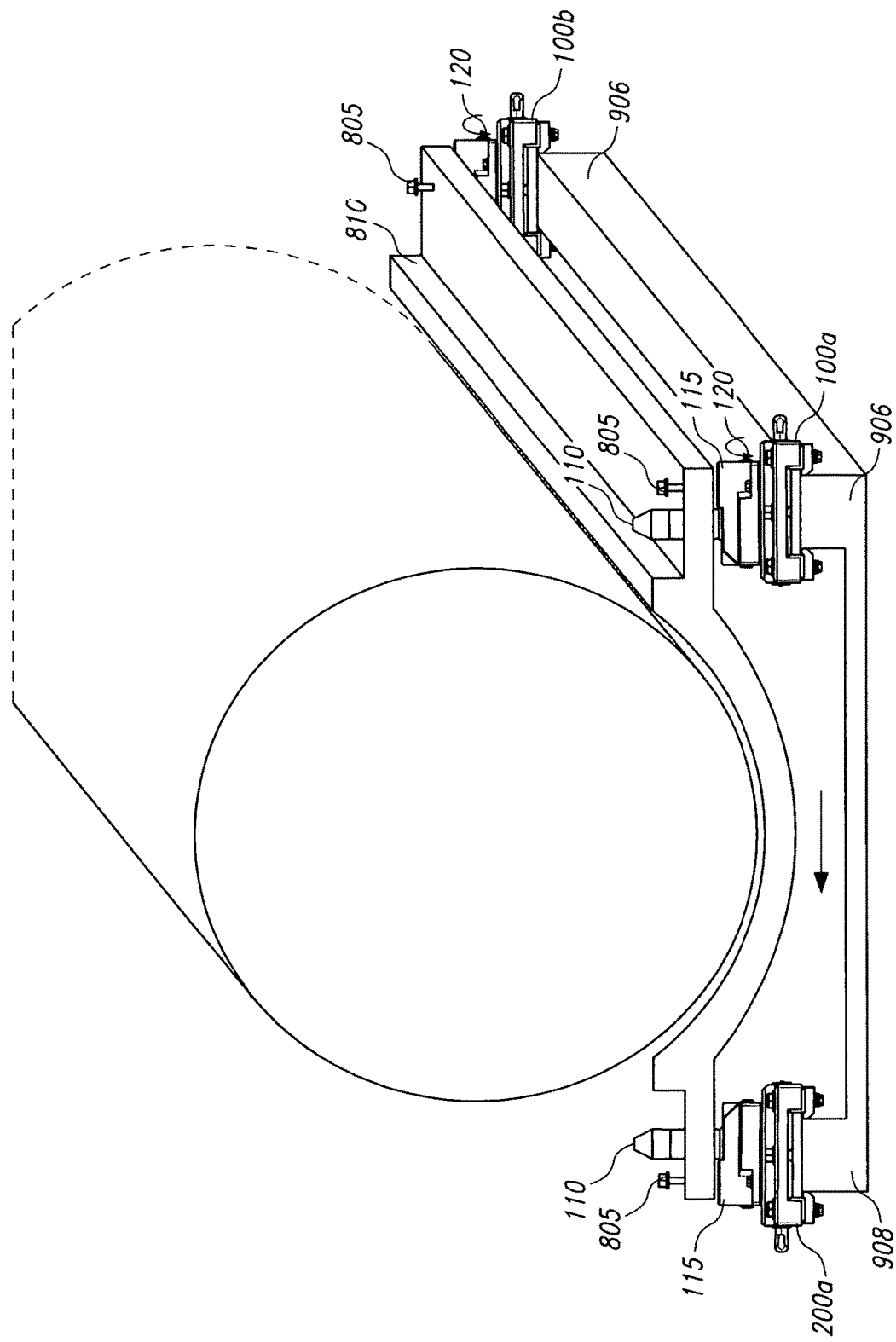
FIG. 12 shows lateral adjustment according to an embodiment of the invention.

To adjust LDUUV 900 laterally, as shown in FIG. 12, lead screws 120 of fixed rollers 100*a* and 100*b* are turned clockwise or anti-clockwise. As lead screw 120 is turned, the threads of threaded shaft 415A move bottom slide fixed 415 along lead screw 120. Bottom slide fixed 415 catches on the interior walls of sway assembly 115, pushing or pulling sway assembly 115 left or right across base block assembly 125. The movement of sway assembly 115 laterally across base block 125 causes upper post 110 to catch in post hole 830, pushing or pulling chock 810 (FIG. 9) left or right across the rails. Post hole 830 interfacing mechanism then catches upper post 110 of a paired floating roller 200. Floating roller 200 is pushed or pulled by interfacing mechanism 800 in tandem with fixed roller 100.

Figure 13:
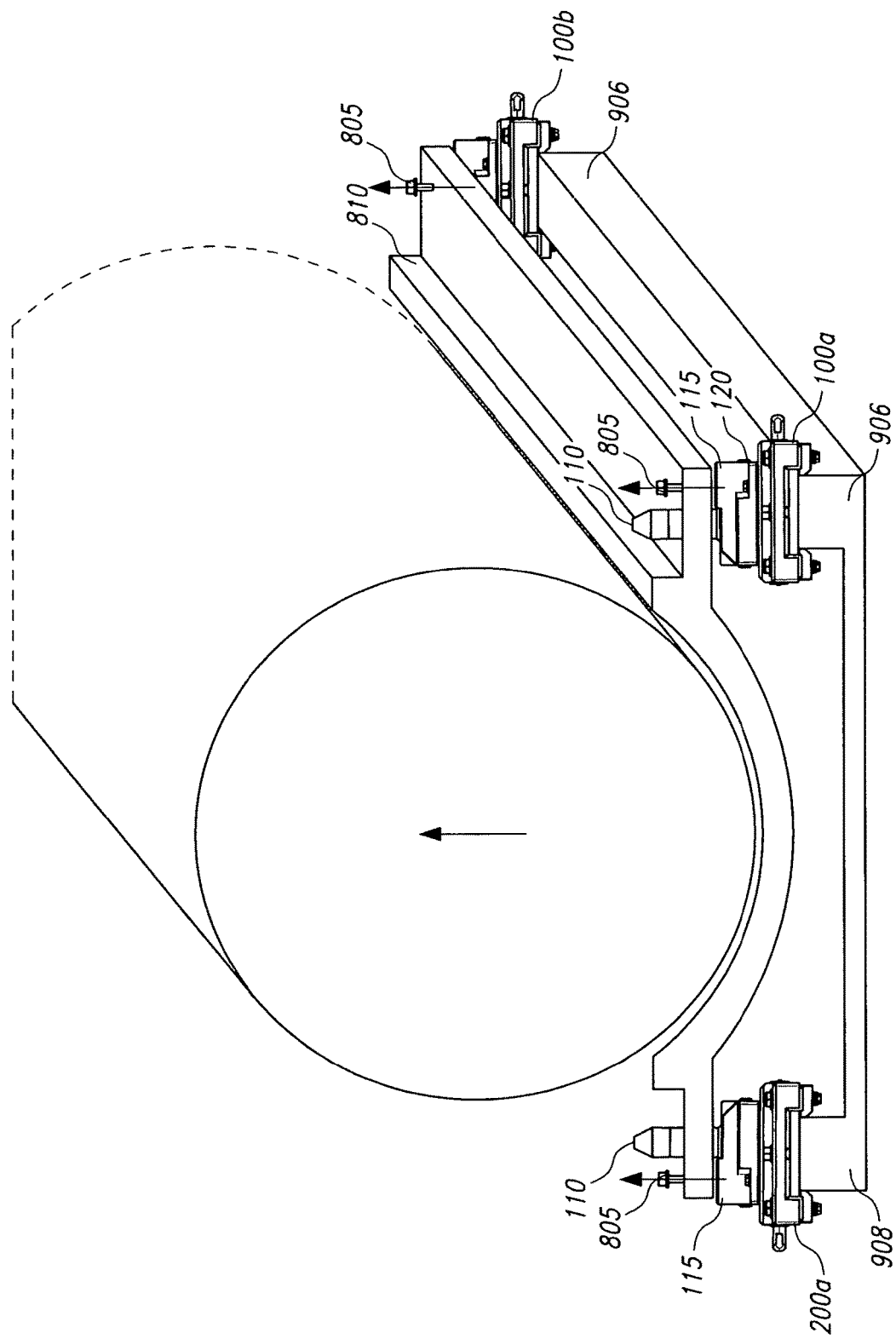
FIG. 13 is an illustration of heave adjustment according to an embodiment of the invention.

FIG. 13 illustrates how to adjust an LDUUV's heave. To adjust an LDUUV's heave, adjustment screws all four 805 of each pair of rollers turn clockwise or anti-clockwise. Turning adjustment screws 805 raises or lowers interface mechanism 800, raising or lowering chock 810 and the LDUUV. Turning adjustment screws 805 an equal amount on all rollers 100*a*, 100*b*, 200*a*, and 200*b*, will raise or lower chock 810 on all ends of LDUUV 900 equally. In the example drawn in FIG. 13, the LDUUV is shown being heaved upward.

Figure 14:
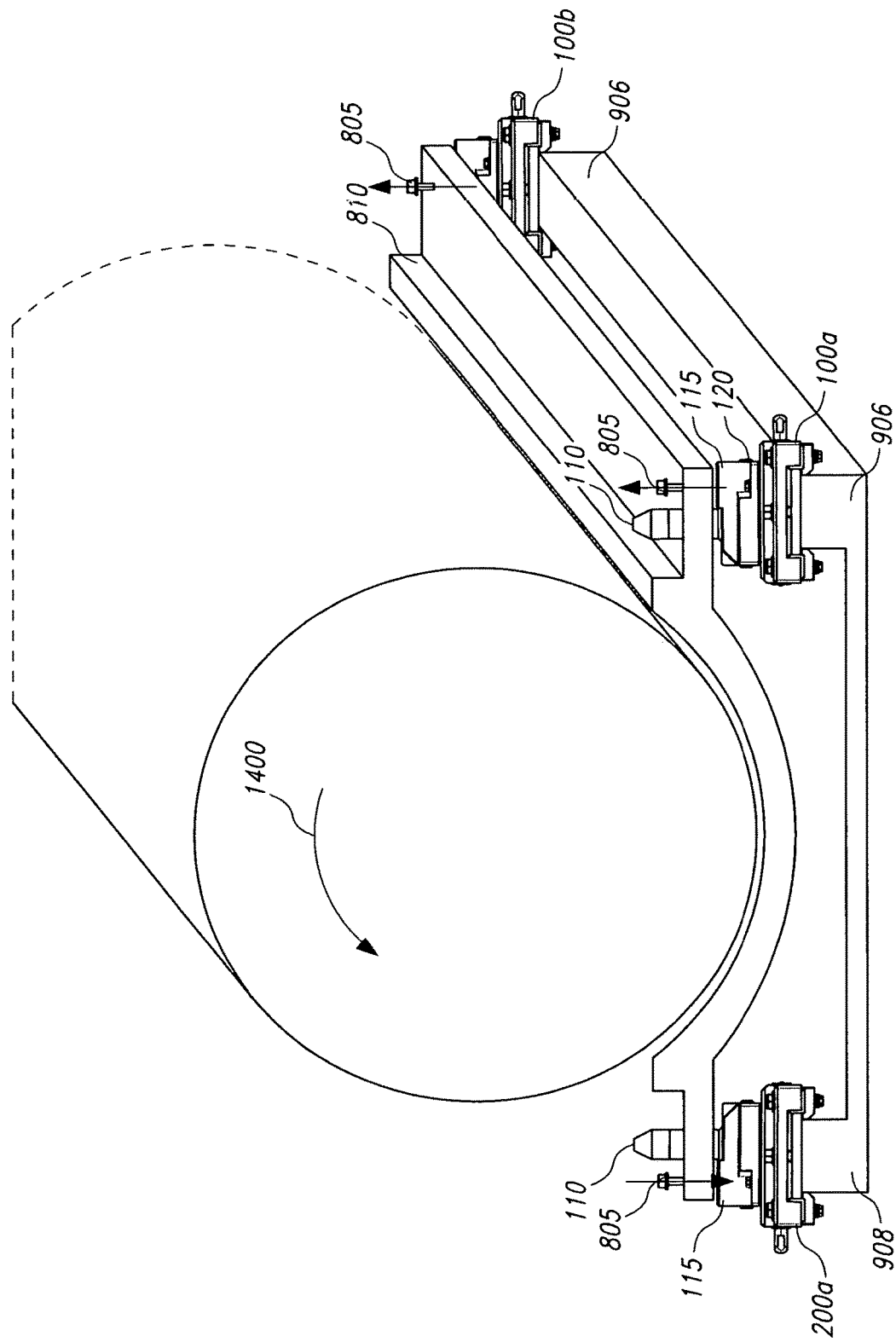
FIG. 14 shows adjustment in roll according to an embodiment of the invention.

To adjust an LDUUV's roll, as illustrated in FIG. 14, adjustment screw 805 of fixed rollers 100*a* and 100*b* are raised. Both of floating rollers 200 remain stationary or are lowered. Alternately, adjustment screw 805 of floating rollers 200 may be raised while fixed rollers 100 remain stationary or are lowered. In the example as drawn in FIG. 14 the LDUUV screw 805 of fixed roller 100 is raised while screw 805 of rollers 200 is lowered resulting in the rolling movement 1400 shown.

Figure 15:
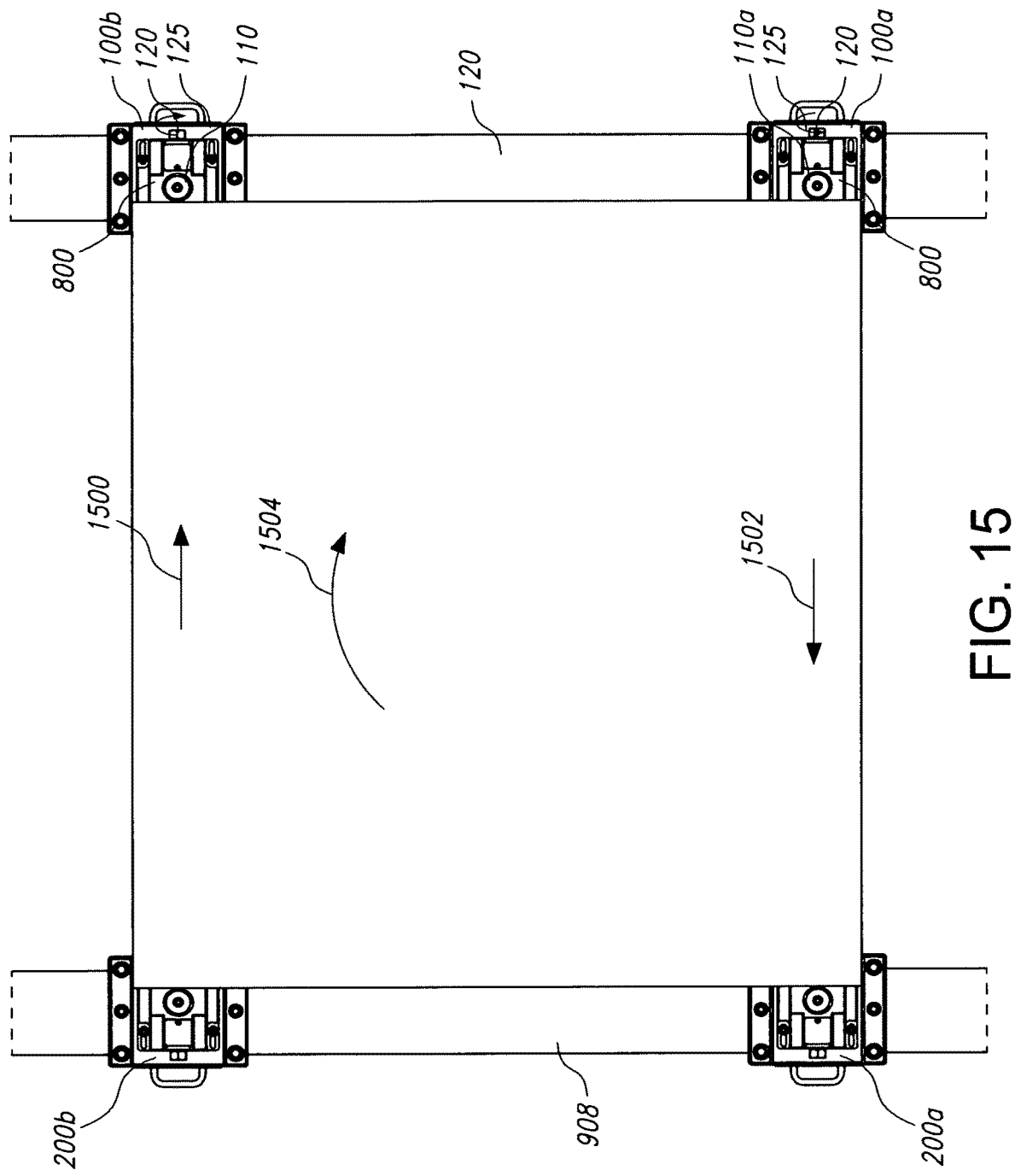
FIG. 15 illustrates adjustment in yaw according to an embodiment of the invention.

FIG. 15 illustrates how to adjust the position of LDUUV 900 in yaw using the fixed and floating nature of the pairs of rollers 100 and 200. As shown in FIG. 15, to adjust LDUUV 900 in yaw, lead screw 120 of a first fixed roller 100*b* is turned in a direction, clockwise for this example, drawing a its sway assembly 115 to one side laterally across a first base block assembly 125 as shown by arrow 1500. Upper post 110 of roller 200*b* catches a first interfacing mechanism 800, pulling a first chock 810 and the associated end of LDUUV 900 to a same side. Lead screw 120 of a second fixed roller 100*a* is turned in an opposite direction, anti-clockwise in this example, pushing its sway assembly 115 away across a second base block assembly 125 in the direction of arrow 1502. Upper post 110 of roller 200*a* catches a second interfacing mechanism 800, pushing a second chock 810 and an aft part of LDUUV to an opposite side. The resulting movement of the LDUUV is shown by arrow 1504.

To adjust an LDUUV longitudinally, the invention rolls along a set of rails. The invention rolls (forward and back) shown in FIGS. 10A and 10B. According to one possible embodiment, handle 130 can be grabbed and used to slide the assembly including the LDUUV along the rails.

This amount of fine adjustment is done with only a few tools, usually only a screwdriver and Allen wrench. This allows for precision alignments and lower risk of damage from misalignments or from free-swinging segments.

The subject matter defined in the appended claims is not necessarily limited to the specific features or acts described above. Rather, the specific features and acts are disclosed as example forms of implementing the claims. Many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for aligning a first part with a second part comprising the steps of:
    a. placing said first part in a chock, said chock having a first side and a second side;
    b. coupling a fixed roller assembly to said first side of said chock;
    c. coupling a floating roller assembly to said second side of said chock; and
    d. repositioning said chock by turning at least one adjustment screw located on at least one of said fixed roller assembly and said floating roller assembly.

2. The method for aligning of claim 1 wherein the step of repositioning said chock further comprises the step of repositioning the first part in pitch.

3. The method for aligning of claim 1 wherein the step of repositioning said chock further comprises the step of repositioning the first part in yaw.

4. The method for aligning of claim 1 wherein the step of repositioning said chock further comprises the step of repositioning the first part in roll.

5. The method for aligning of claim 1 wherein the step of repositioning said chock further comprises the step of repositioning the first part in heave.

6. The method for aligning of claim 1 wherein the step of repositioning said chock further comprises the step of repositioning the first part laterally.

\* \* \* \* \*